United States Patent
Miao et al.

(10) Patent No.: US 11,949,612 B2
(45) Date of Patent: Apr. 2, 2024

(54) METHODS, APPARATUS AND SYSTEMS FOR DISCOVERING WIRELESS COMMUNICATION NODES

(71) Applicant: ZTE Corporation, Guangdong (CN)

(72) Inventors: Ting Miao, Guangdong (CN); Feng Bi, Guangdong (CN); Wenhao Liu, Guangdong (CN); Youxiong Lu, Guangdong (CN); Weimin Xing, Guangdong (CN)

(73) Assignee: ZTE Corporation, Shenzhen (CN)

( * ) Notice: Subject to any disclaimer, the term of this patent is extended or adjusted under 35 U.S.C. 154(b) by 505 days.

(21) Appl. No.: 17/172,713

(22) Filed: Feb. 10, 2021

(65) Prior Publication Data
US 2021/0168748 A1    Jun. 3, 2021

Related U.S. Application Data

(63) Continuation of application No. PCT/CN2018/099823, filed on Aug. 10, 2018.

(51) Int. Cl.
| | |
|---|---|
| *H04L 5/00* | (2006.01) |
| *H04L 27/26* | (2006.01) |
| *H04W 48/16* | (2009.01) |
| *H04W 56/00* | (2009.01) |

(Continued)

(52) U.S. Cl.
CPC .......... *H04L 5/0048* (2013.01); *H04L 5/0023* (2013.01); *H04L 5/0094* (2013.01); *H04L 27/2602* (2013.01); *H04L 27/26025* (2021.01); *H04L 27/261* (2013.01); *H04W 48/16* (2013.01); *H04W 56/0015* (2013.01); *H04W 74/006* (2013.01); *H04W 84/047* (2013.01)

(58) Field of Classification Search
CPC ... H04L 5/0048; H04L 5/0023; H04L 5/0094; H04L 27/2602; H04L 27/26025; H04L 27/261; H04W 48/16; H04W 56/0015; H04W 74/006; H04W 84/047; H04W 24/02; H04W 74/04; H04W 72/0446; H04W 72/0453
See application file for complete search history.

(56) References Cited

U.S. PATENT DOCUMENTS

| | | | |
|---|---|---|---|
| 2018/0049190 A1* | 2/2018 | Abedini | H04W 56/001 |
| 2020/0145912 A1* | 5/2020 | You | H04W 16/28 |

OTHER PUBLICATIONS

Supplementary European Search Report for EP Patent Application No. 18929092.7, dated Jul. 14, 2021, 12 pages.

(Continued)

*Primary Examiner* — Hashim S Bhatti

(74) *Attorney, Agent, or Firm* — Perkins Coie LLP

(57) ABSTRACT

Methods, apparatus and systems for wireless communication nodes to discover each other are disclosed. In one embodiment, a method performed by a first wireless communication node is disclosed. The method comprises: transmitting, to each of a plurality of second wireless communication nodes, respective configuration information that is utilized by the second wireless communication node to transmit a discovery signal in order to be discovered by at least one other second wireless communication node. At least two of the plurality of second wireless communication nodes transmit their discovery signals at different time domain positions based on their respective configuration information.

12 Claims, 9 Drawing Sheets

(51) Int. Cl.
*H04W 74/00* (2009.01)
*H04W 84/04* (2009.01)

(56) References Cited

OTHER PUBLICATIONS

AT&T: "NR Initial Access Procedure Design", 3GPP Draft; R1-1612361 NR-InitialAccess, 3GPP, Mobile Competence Centre; 650, Route Des Lucioles ; F-06921 Sophia-Antipolis Cedex; France vol. RAN WGI, No. Reno, USA; Nov. 14, 2016-Nov. 18, 2016 Nov. 13, 2016 (Nov. 13, 2016), XP051176309, Retrieved from the Internet: URL:http://www.3gpp.org/ftp/Meetings 3GPP_SYNC/RAN1/Docs/ [retrieved on Nov. 13, 2016].
Intel Corporation: "PHY layer enhancement for NR IAB", 3GPP Draft; R1-1806551, 3GPP, Mobile Competence Centre; 650, Route Des Lucioles ; F-06921 Sophia-Antipolis Cedex; France vol. RAN WGI, No. Busan, South Korea; May 21, 2018-May 25, 2018 May 20, 2018 (May 20, 2018), XP051441753, Retrieved from the Internet: URL:http://www.3gpp.org/ftp/Meetings%5F3GPP_SYNC/RAN1/Docs/ [retrieved on May 20, 2018].
Rapporteur (Ericsson): "Corrections on EN-DC", 3GPP Draft; 38331 15.0.1 6.3.2.X SSB-Index—SubcarrierSpacing—TCI-STATE—TDD-UL-DL—ZP-CSI-RS VII, 3GPP, Mobile Competence Centre; 650, Route Des Lucioles; vol. RAN WG2, No. Athens, Greece; Feb. 26, 2018-Mar. 2, 2018 Feb. 9, 2018 (Feb. 9, 2018), XP051565999, Retrieved from the Internet: URL:http://www.3gpp.org/ftp/Email%5FDiscussions/RAN2/[Misc]/ASN1%20review/TS%2038331%202018%2D02/A1%5FL1%2DParameters [retrieved on Feb. 9, 2018].
Korean office action issued in KR Patent Application No. 10-2021-7006837, dated Mar. 28, 2023, 7 pages. English translation included.
Japanese notice of allowance issued in JP Patent Application No. 2021-507001, dated Apr. 24, 2023, 4 pages. English translation included.
ZTE, "Overview of physical layer enhancements for IAB," 3GPP TSG RAN WG1 Meeting #93, R1-1806024, Busan, Korea, May 21-25, 2018, 9 pages.
Japanese office action issued in JP Patent Application No. 2021-507001, dated Oct. 14, 2022, 5 pages. English translation included.
Japanese office action issued in JP Patent Application No. 2021-507001, dated Apr. 20, 2022, 6 pages. English translation included.
Korean office action issued in KR Patent Application No. 10-2021-7006837, dated Aug. 30, 2022, 4 pages. English translation included.
Korean office action issued in KR Patent Application No. 10-2021-7006837, dated Dec. 30, 2021, 8 pages. English translation included.
International Search Report and Written Opinion in International Application No. PCT/CN2018/099823, dated Apr. 28, 2019, 6 pages.
AT&T, "Overview of physical layer enhancements for IAB", 3GPP TSG RAN WG1 Meeting #92bis R1-1804662,Apr. 20, 2018 (Apr. 20, 2018), Sanya, China, 7 pages.
Huawei et al., "Physical layer enhancement on IAB", 3GPP TSG RAN WG1 Meeting #92bis R1-1803695,Apr. 20, 2018 (Apr. 20, 2018), Sanya, China, 6 pages.
Qualcomm Incorporated, "Enhancements to support NR backhaul links", 3GPP TSG RAN WG1 Meeting #92bis R1-1804835,Apr. 20, 2018 (Apr. 20, 2018), Sanya, China, 9 pages.
ZTE et al., "IAB enhancements overview", 3GPP TSG RAN WG1 Meeting #92bis R1-1804505,Apr. 20, 2018 (Apr. 20, 2018), Sanya, China, 5 pages.
European office action issued in EP Patent Application No. 18929092.7, dated Jun. 15, 2023, 8 pages.
Huawei et al., "Physical layer enhancement consideration on IAB," 3GPP TSG RAN WG1 Meeting #93, R1-1805925, Busan, Korea, May 21-25, 2018, 8 pages.
Sony, "Discussion on NR enhancements to support IAB," 3GPP TSG RAN WG1 Meeting #93, R1-1806572, Busan, Korea, May 21-25, 2018, 4 pages.
ZTE, "Discussion on IAB node initial access process," 3GPP TSG RAN WG1 Meeting #93, R1-1806026, Busan, Korea, May 21-25, 2018, 10 pages.
Nokia et al., "Measurements for IAB," 3GPP TSG-RAN WG2 Meeting NR Adhoc 1807, R2-1810305, Montreal, Canada, Jul. 2-6, 2018, Revision of R2-1807723, 5 pages.
Korean notice of allowance issued in KR Patent Application No. 10-2021-7006837, dated Jul. 30, 2023, 9 pages. English translation included.
Japanese office action issued in JP Patent Application No. 2023-20658, dated Nov. 14, 2023, 4 pages. English translation included.

\* cited by examiner

METHODS, APPARATUS AND SYSTEMS FOR DISCOVERING WIRELESS COMMUNICATION NODES

CROSS-REFERENCE TO RELATED APPLICATIONS

This application is a continuation of International Patent Application No. PCT/CN2018/099823, filed on Aug. 10, 2018, the contents of which are incorporated herein by reference in their entirety.

TECHNICAL FIELD

The disclosure relates generally to wireless communications and, more particularly, to methods, apparatus and systems for wireless communication nodes to discover each other.

BACKGROUND

Relay technology is one of the main technologies adopted by the long term evolution advanced (LTE-A) system, and can effectively expand network coverage, improve cell edge data rate, and avoid the construction of wired transmission network by using wireless backhaul, which can be quickly deployed to reduce the construction of operators and save operating costs. Relay technology will be further utilized in the fifth generation (5G) new radio (NR) network and its subsequent evolution versions. For example, the IAB (Integrated Access and Backhaul) technology in the 5G NR network can further support a multi-hop relay system, where the network topology also supports redundant connections. In a multi-hop relay system, if the quality of a link between a relay node and its upper parent node is poor, the relay node needs to access a new parent node, with respect to which the relay node is a child node. The relay node itself can also be a parent node for one or more subordinate child nodes that may include terminals or other relay nodes.

The wireless IAB can be used to flexibly and densely deploy NR cells without the need of laying a large number of optical fibers, saving network deployment costs. An important aspect of IAB research is for IAB nodes to discover each other, which is critical to building multiple backhaul connections and improving communication robustness. The study of the discovery process of IAB nodes focused on half-duplex and multi-hop topology. The half-duplex constraint means that an IAB node cannot receive and transmit data at the same time.

One way to discover an IAB node is by receiving synchronization signal blocks (SSBs) used for initial access from the IAB node. That is, the SSBs used for initial access are also used as discovery signals for other IAB nodes to discover the IAB node. But the IAB node also provides services for subordinate user equipment (UE) and child IAB nodes. As such, under half-duplex constraint, an IAB node cannot receive SSBs sent by other IAB nodes in the time domain position where the IAB node transmits its own SSBs for initial access. So the SSBs that are used by IAB nodes for initial access should not overlap in the time domain.

In a typical example, the period of the SSBs used for initial access is less than or equal to 20 milliseconds, while in each period the SSBs are transmitted in a half frame (5 milliseconds) according to a beam scanning manner Therefore, it is difficult for multiple IAB nodes to have their SSBs non-overlapping in the time domain. The SSBs of neighboring IAB nodes may be transmitted in a same time domain. For these neighboring IAB nodes to discover each other, an IAB node must keep SSB silent in certain period, e.g. not transmit any SSB in the period, to monitor the SSBs sent by other IAB nodes and discover other IAB nodes. But the silence of the initial access SSBs may affect the initial access of the UEs to the IAB node.

Thus, existing systems and methods for wireless communication nodes to discover each other are not entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a first wireless communication node is disclosed. The method comprises: transmitting, to each of a plurality of second wireless communication nodes, respective configuration information that is utilized by the second wireless communication node to transmit a discovery signal in order to be discovered by at least one other second wireless communication node. At least two of the plurality of second wireless communication nodes transmit their discovery signals at different time domain positions based on their respective configuration information.

In another embodiment, a method performed by a first wireless communication node is disclosed. The method comprises: receiving configuration information from a second wireless communication node; and transmitting, based on the configuration information, a discovery signal in order to be discovered by other wireless communication nodes. The first wireless communication node and at least one of the other wireless communication nodes transmit their discovery signals at different time domain positions based on their respective configuration information.

In yet another embodiment, a method performed by a first wireless communication node is disclosed. The method comprises: determining configuration information; transmitting the configuration information to a second wireless communication node; and transmitting, based on the configuration information, a discovery signal in order to be discovered by other wireless communication nodes. The first wireless communication node and at least one of the other wireless communication nodes transmit their discovery signals at different time domain positions based on their respective configuration information.

In still another embodiment, a method performed by a first wireless communication node is disclosed. The method comprises: receiving, from each of a plurality of second wireless communication nodes, respective configuration information that is utilized by the second wireless communication node to transmit a discovery signal in order to be discovered by at least one other second wireless communication node. At least two of the plurality of second wireless communication nodes transmit their discovery signals at different time domain positions based on their respective configuration information.

In a different embodiment, a wireless communication node configured to carry out a disclosed method in some embodiment is disclosed.

In yet another embodiment, a non-transitory computer-readable medium having stored thereon computer-executable instructions for carrying out a disclosed method in some embodiment is disclosed.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Figure 1:
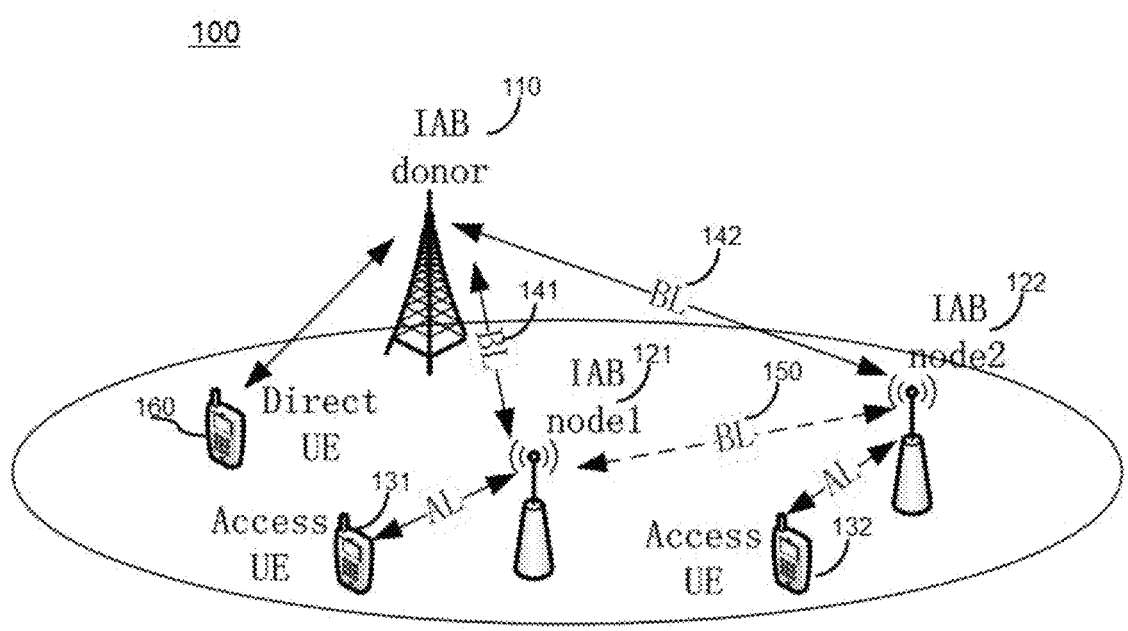
FIG. 1 illustrates an exemplary Integrated Access and Backhaul (IAB) network in which techniques disclosed herein may be implemented, in accordance with an embodiment of the present disclosure.

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

A typical wireless communication network includes one or more base stations (typically known as a "BS") that each provides geographical radio coverage, and one or more wireless user equipment devices (typically known as a "UE") that can transmit and receive data within the radio coverage. In the wireless communication network, a BS and a UE can communicate with each other via a communication link, e.g., via a downlink radio frame from the BS to the UE or via an uplink radio frame from the UE to the BS. In a multi-hop relay system, one or more relay nodes may be deployed between a BS and a UE on each branch of the multi-hop relay system. Due to a failure of handover or radio link, a relay node may need to disconnect the old link with the old parent node and switch to a new parent node. But before that, the relay node needs to discover the new parent node, e.g. by receiving a discovery signal from the new parent node. While receiving the discovery signal, the relay node cannot transmit data at the same time due to the half-duplex constraint.

In order for different relay nodes to discover each other under the half-duplex constraint, the present disclosure provides methods, apparatus and systems for generating and transmitting configuration information, to efficiently coordinate the transmissions of discovery signals by different relay nodes. In one embodiment, a donor node can transmit configuration information to multiple relay nodes associated with the donor node. The configuration information indicates each relay node to transmit a respective discovery signal at a certain time domain position, at a certain frequency position, and/or with a certain subcarrier spacing. The time domain position may be different from a time domain position for a transmission of a synchronization signal block (SSB) during an initial access process of a UE or a child node of the relay node. The frequency position may be different from a frequency position for transmitting SSB, e.g. maybe not on a synchronization raster of a carrier frequency in which the relay node operates. The configuration information may also indicate each relay node to monitor other discovery signals from other relay nodes at a certain time domain position, at a certain frequency position, and/or with a certain subcarrier spacing. The respective configuration information sent to different relay nodes may ensure that at least two of the relay nodes transmit their discovery signals at different time domain positions based on their respective configuration information, such that they can monitor each other's discovery signals to discover each other.

In another embodiment, a relay node may determine its own configuration information for transmitting a discovery signal in order to be discovered by at least one other relay node. The relay node transmits the discovery signal at a certain time domain position, at a certain frequency position, and/or with a certain subcarrier spacing, based on the configuration information. The relay node sends the configuration information to the donor node that can determine a monitoring configuration and transmit the monitoring configuration to the relay node. The relay node may monitor other discovery signals from other relay nodes at a certain time domain position, at a certain frequency position, and/or with a certain subcarrier spacing, based on the monitoring configuration. The respective monitoring information sent to different relay nodes may ensure that at least two of the relay nodes can monitor each other's discovery signals to discover each other.

In various embodiments, a BS is referred to as a network side node and can include, or be implemented as, a next Generation Node B (gNB), an E-UTRAN Node B (eNB), a Transmission/Reception Point (TRP), an Access Point (AP), a donor node (DN), etc. A UE in the present disclosure can be referred to as a terminal and can include, or be implemented as, a mobile station (MS), a station (STA), etc. A relay node (RN) may have functions similar to those of a BS and/or functions similar to those of a UE. A BS and a RN may be described herein as non-limiting examples of "wireless communication nodes;" and a UE may be described herein as non-limiting examples of "wireless communication devices." The BS, RN, and UE can practice the methods disclosed herein and may be capable of wireless and/or wired communications, in accordance with various embodiments of the present disclosure.

FIG. 1 illustrates an exemplary Integrated Access and Backhaul (IAB) network 100 in which techniques disclosed herein may be implemented, in accordance with an embodiment of the present disclosure. As shown in FIG. 1, the exemplary IAB network 100 includes a base station, the IAB donor 110, a plurality of IAB relay nodes, 121, 122, and a plurality of UEs 160, 131, 132. The IAB donor 110 is connected to the core network to provide a wireless backhaul function for the IAB nodes 121, 122, and provides a radio access function for the UEs. The UE 160 under the IAB donor 110 is called a direct UE. An IAB node has two functions: an access node function and a UE function. The access node function means the IAB node can work like a base station to provide the radio access function for a UE. The UE function means the IAB node can work like a UE to be controlled and scheduled by the IAB donor or an upper IAB node. A UE, e.g. the UEs 131, 132, under an IAB node is called an access UE.

A link between an IAB donor and an IAB node, as well as a link between the IAB nodes, is called a backhaul link (BL). A link between an IAB node and a UE is called an access link (AL). As shown in FIG. 1, while the BL 141 and the BL 142 have been established, the IAB node 1 121 and the IAB node 2 122 may want to establish the BL 150 between them, to avoid a failure of handover or radio link or to improve communication quality.

Figure 2:
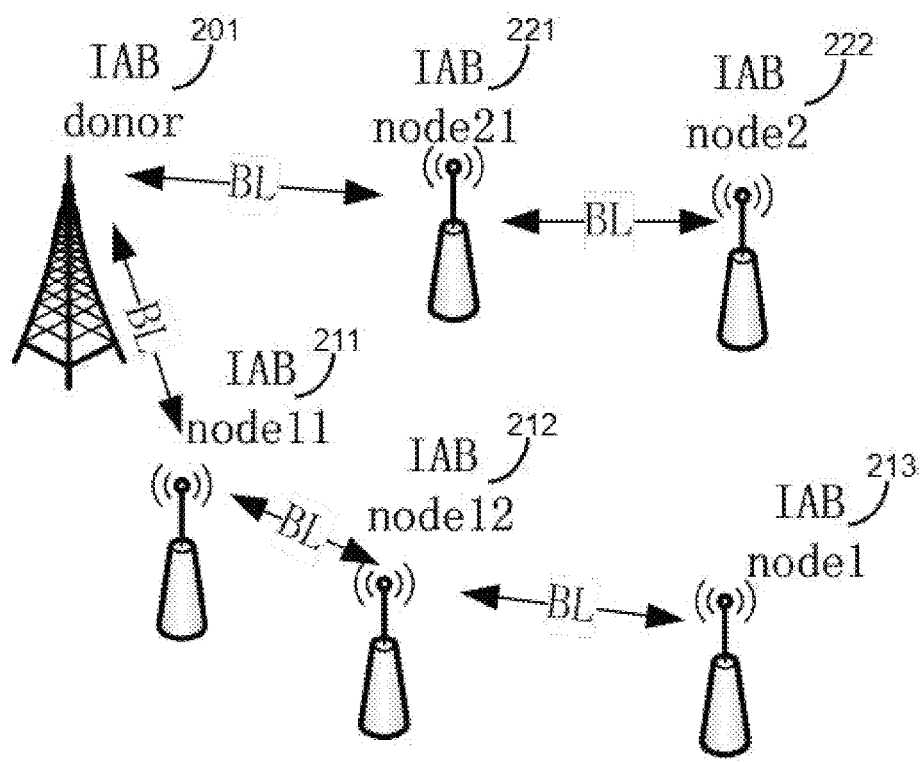
FIG. 2 illustrates an exemplary multi-hop relay system in which techniques disclosed herein may be implemented, in accordance with an embodiment of the present disclosure.

FIG. 2 illustrates an exemplary multi-hop relay system 200 in which techniques disclosed herein may be implemented, in accordance with an embodiment of the present disclosure. As shown in FIG. 2, the exemplary multi-hop relay system 200 includes an IAB donor node 201 connected to two branches of relay nodes. One branch includes IAB node21 221 and IAB node2 222. The IAB donor node 201 is the parent node of the IAB node21 221 that is in turn the parent node of the IAB node2 222. Correspondingly, the IAB node2 222 is the child node of the IAB node21 221 that is in turn the child node of the IAB donor node 201. Another branch includes IAB node11 211, IAB node12 212, and IAB node1 213. The IAB donor 201 can transmit a time domain configuration of the discovery signal to the IAB nodes step by step, through an upper IAB node of each IAB node.

Taking second branch including the IAB node1 213 as an example, the transmission path of the time domain configuration information of the discovery signal is: IAB donor 201→IAB node11 211→IAB node12 212→IAB node1 213. In one embodiment, the IAB donor 201 transmits configuration information for the discovery signals of all IAB nodes in the second branch to the IAB node11 211. The IAB node11 211 extracts its own portion from the received configuration information, and forwards the remaining configuration information to the IAB node12 212, that will in turn extract its own portion from the received configuration information, and forward the remaining configuration information to the IAB node1 213. The transmission mode of the time domain configuration information of the discovery signal for the first branch including the IAB node2 222 works in a similar manner.

Figure 3:
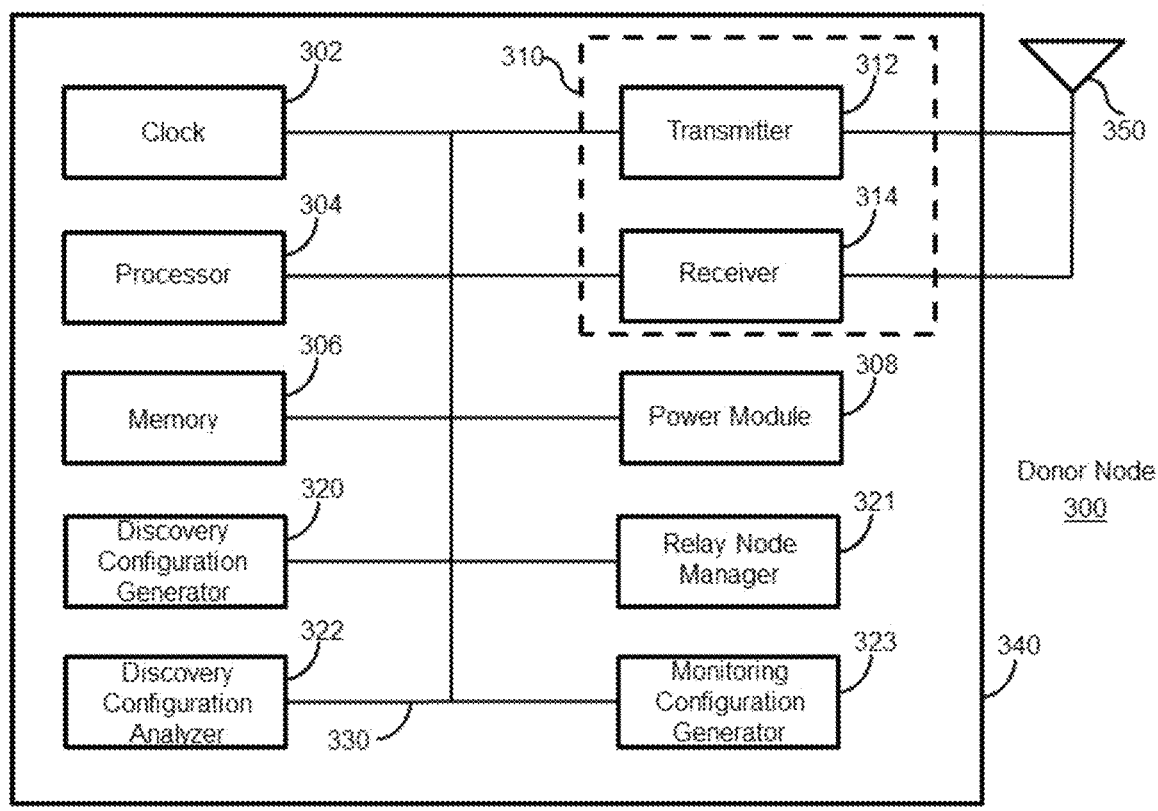
FIG. 3 illustrates a block diagram of a donor node (DN), in accordance with some embodiments of the present disclosure.

FIG. 3 illustrates a block diagram of a donor node (DN) 300, in accordance with some embodiments of the present disclosure. The DN 300 is an example of a node that can be configured to implement the various methods described herein. As shown in FIG. 3, the DN 300 includes a housing 340 containing a system clock 302, a processor 304, a memory 306, a transceiver 310 comprising a transmitter 312 and receiver 314, a power module 308, a discovery configuration generator 320, a relay node manager 321, a discovery configuration analyzer 322, and a monitoring configuration generator 323.

In this embodiment, the system clock 302 provides the timing signals to the processor 304 for controlling the timing of all operations of the DN 300. The processor 304 controls the general operation of the DN 300 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 306, which can include both read-only memory (ROM) and random access memory (RAM), can provide instructions and data to the processor 304. A portion of the memory 306 can also include non-volatile random access memory (NVRAM). The processor 304 typically performs logical and arithmetic operations based on program instructions stored within the memory 306. The instructions (a.k.a., software) stored in the memory 306 can be executed by the processor 304 to perform the methods described herein. The processor 304 and memory 306 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 310, which includes the transmitter 312 and receiver 314, allows the DN 300 to transmit and receive data to and from a remote device (e.g., a BS, a RN, or a UE). An antenna 350 is typically attached to the housing 340 and electrically coupled to the transceiver 310. In various embodiments, the DN 300 includes (not shown) multiple transmitters, multiple receivers, and multiple transceivers. In one embodiment, the antenna 350 is replaced with a multi-antenna array 350 that can form a plurality of beams each of which points in a distinct direction. The transmitter 312 can be configured to wirelessly transmit packets having different packet types or functions, such packets being generated by the processor 304. Similarly, the receiver 314 is configured to receive packets having different packet types or functions, and the processor 304 is configured to process packets of a plurality of different packet types. For example, the processor 304 can be configured to determine the type of packet and to process the packet and/or fields of the packet accordingly.

In a communication system including the DN 300 and relay nodes associated with the DN 300, the DN 300 may help to coordinate the relay nodes (RNs) to discover each other. In one embodiment, the DN 300 can generate discovery configurations for the RNs. For example, the discovery configuration generator 320 may generate configuration information that can be utilized by an RN to transmit a discovery signal in order to be discovered by at least one other RN. The discovery configuration generator 320 may transmit, via the transmitter 312, respective configuration information to each of the RNs, such that at least two of the RNs transmit their discovery signals at different time domain positions based on their respective configuration information.

In one embodiment, the respective configuration information for each RN comprises information about at least one of the following: a first subcarrier spacing for a transmission of the discovery signal by the RN; a time domain configuration for the transmission of the discovery signal; a frequency position for the transmission of the discovery signal; and a monitoring configuration for the RN to monitor at least one other discovery signal transmitted by at least one other RN. The time domain configuration comprises information related to at least one of: a transmission window period for the transmission of the discovery signal; an offset of a transmission window that refers to a time window for transmitting the discovery signal; at least one time domain position in the transmission window for the transmission of the discovery signal; at least one hop order of the RN; at least one identifier of the RN; and at least one cell identifier for the RN. The offset indicates which transmission window in the transmission window period to transmit the discovery signal. Candidate time domain positions in the transmission window for the transmission of the discovery signal are the same as candidate time domain positions in the transmission window for a transmission of an SSB with a same subcarrier spacing as the discovery signal. The at least one time domain position is indicated by a bitmap whose size is equal to a quantity of the candidate time domain positions and determined by a frequency band range in which the discovery signal is located.

In one embodiment, the frequency position for the transmission of the discovery signal refers to a center frequency position of the discovery signal. The frequency position for the transmission of the discovery signal is indicated by a new radio absolute radio frequency channel number (NR-ARFCN). A default value of the frequency position for the transmission of the discovery signal is a carrier center frequency or a center frequency of an SSB for an initial access process of the RN.

In one embodiment, the monitoring configuration comprises information about at least one of: a frequency position for monitoring the at least one other discovery signal, a second subcarrier spacing of the at least one other discovery signal, and at least one monitoring window configuration. The frequency position for monitoring the at least one other discovery signal may refer to a center frequency position of the at least one other discovery signal. A default value of the frequency position for monitoring the at least one other discovery signal is a carrier center frequency or a center frequency position for the transmission of the discovery signal. A default value of the second subcarrier spacing is a subcarrier spacing of an SSB for an initial access process of the RN. Each of the at least one monitoring window configuration corresponds to at least one monitored cell or at least one monitored RN. At least one monitoring window configuration comprises at least one of: a monitoring window period; an offset of a monitoring window, a duration of the monitoring window; a time domain position of the at least one discovery signal monitored in the monitoring window; all time domain configurations for the transmissions of the discovery signals by the RNs; at least one identifier for at least one monitored cell; at least one hop order for at least one monitored RN; and at least one identifier for the at least one monitored RN. The offset of the monitoring window indicates which monitoring window within the monitoring window period to monitor the at least one discovery signal. The time domain position of the at least one discovery signal is indicated by a bitmap whose size is determined by a frequency band range in which the at least one discovery signal is monitored.

According to various embodiments, the DN 300 manages transmission configurations for the RNs associated with the DN 300. For example, the relay node manager 321 may generate and/or determine management related information for the RNs.

In one example, the management related information may include a time domain configuration for a transmission of an SSB during an initial access process of a UE or a child node of each RN. The relay node manager 321 can send the management related information to the discovery configuration generator 320 to generate proper discovery configurations, such that for at least one of the RNs, the time domain configuration for the transmission of the discovery signal is different from a time domain configuration for a transmission of an SSB during an initial access process of a UE or a child node of the RN.

In another example, the management related information may include frequency information, e.g. a synchronization raster of a carrier frequency in which each RN operates. The relay node manager 321 can send the management related information to the discovery configuration generator 320 to generate proper discovery configurations, such that for at least one of the RNs, the frequency position for the transmission of the discovery signal is not on a synchronization raster of a carrier frequency in which the RN operates.

In yet another example, the management related information may include hop and branch related information of each RN, e.g. information about child nodes of the RN. The relay node manager 321 can send the management related information to the discovery configuration generator 320 to generate proper discovery configurations, such that for at least one of the RNs, the respective configuration information comprises at least one time domain configuration for one or more RNs, e.g. including child nodes of the RN, to transmit discovery signals.

In one embodiment, the DN 300 may not be the one that generates time domain configuration for transmissions of discovery signals. The DN 300 may instead receive configuration information, e.g. the time domain configuration, for transmissions of discovery signals from the RNs themselves. The DN 300 may determine the discovery configuration mode, about whether to generate discovery configuration or receive discovery configuration, based on a system pre-definition or a pre-determined standard or protocol. For example, the relay node manager 321 may determine the discovery configuration mode and instruct, either the discovery configuration generator 320 to generate the discovery configuration or the discovery configuration analyzer 322 to receive discovery configuration.

The discovery configuration analyzer 322 in this example may receive, via the receiver 314, from each of the RNs associated with the DN 300, respective configuration information that is utilized by the RN to transmit a discovery signal in order to be discovered by at least one other RN. In one embodiment, at least two of the RNs transmit their discovery signals at different time domain positions based on their respective configuration information.

The discovery configuration analyzer 322 may analyze each configuration information to determine its content. In one embodiment, the respective configuration information for each RN comprises information about at least one of the following: a first subcarrier spacing for a transmission of the discovery signal by the RN; a time domain configuration for the transmission of the discovery signal; and a frequency position for the transmission of the discovery signal. The time domain configuration may comprise information related to at least one of: a transmission window period for the transmission of the discovery signal; an offset of a transmission window that refers to a time window for transmitting the discovery signal; at least one time domain position in the transmission window for the transmission of the discovery signal; at least one hop order of the RN; at least one identifier of the RN; and at least one cell identifier for the RN. The offset indicates which transmission window in the transmission window period to transmit the discovery signal. Candidate time domain positions in the transmission window for the transmission of the discovery signal are the same as candidate time domain positions in the transmission window for a transmission of an SSB with a same subcarrier spacing as the discovery signal. The at least one time domain position is indicated by a bitmap whose size is equal to a quantity of the candidate time domain positions and determined by a frequency band range in which the discovery signal is located. In one embodiment, the offset of the transmission window is determined by each RN randomly determining one transmission window in the transmission window period to transmit the discovery signal. The discovery configuration analyzer 322 may send the analyzed configuration information to the monitoring configuration generator 323 for generating monitoring configuration.

The monitoring configuration generator 323 in this example may generate the monitoring configuration based on the configuration information received from the plurality of RNs. The monitoring configuration generator 323 may transmit, via the transmitter 312, to each of the RNs, a respective monitoring configuration that is utilized by the RN to monitor at least one other discovery signal transmitted by at least one other RN based on the monitoring configuration. In one embodiment, the respective monitoring information sent to different RNs may ensure that at least two of the RNs can monitor each other's discovery signals to discover each other.

The power module 308 can include a power source such as one or more batteries, and a power regulator, to provide regulated power to each of the above-described modules in FIG. 3. In some embodiments, if the DN 300 is coupled to a dedicated external power source (e.g., a wall electrical outlet), the power module 308 can include a transformer and a power regulator.

The various modules discussed above are coupled together by a bus system 330. The bus system 330 can include a data bus and, for example, a power bus, a control signal bus, and/or a status signal bus in addition to the data bus. It is understood that the modules of the DN 300 can be operatively coupled to one another using any suitable techniques and mediums.

Although a number of separate modules or components are illustrated in FIG. 3, persons of ordinary skill in the art will understand that one or more of the modules can be combined or commonly implemented. For example, the processor 304 can implement not only the functionality described above with respect to the processor 304, but also implement the functionality described above with respect to the discovery configuration generator 320. Conversely, each of the modules illustrated in FIG. 3 can be implemented using a plurality of separate components or elements.

Figure 4A:
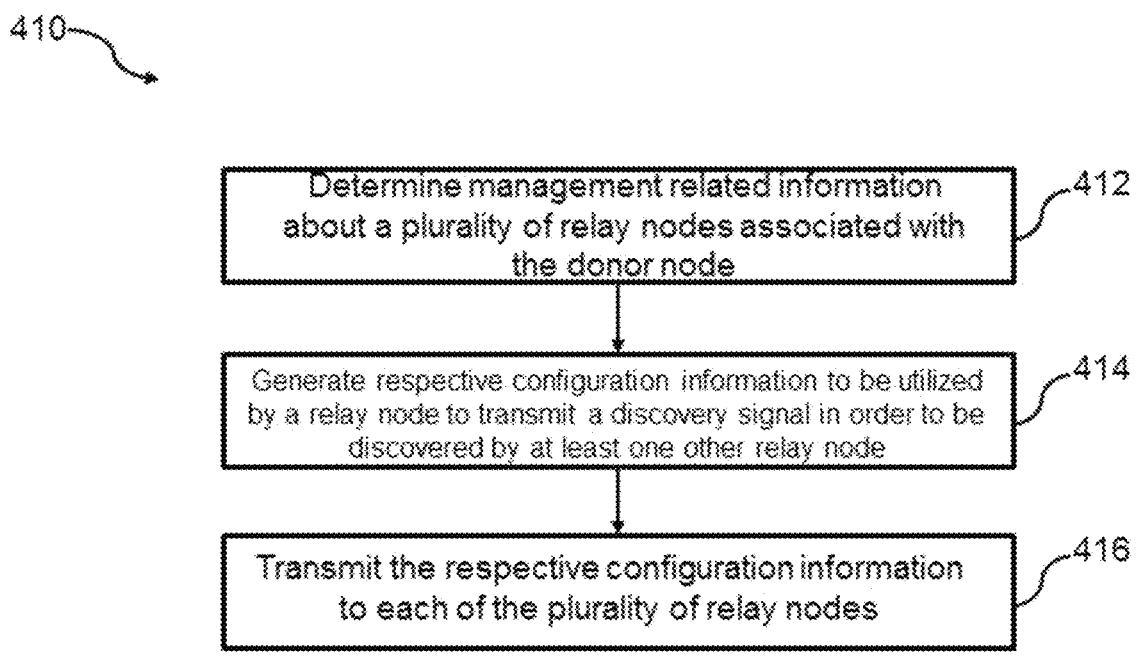
FIG. 4A illustrates a flow chart for a method performed by a DN for discovering wireless communication nodes, in accordance with some embodiments of the present disclosure.

FIG. 4A illustrates a flow chart for a method 410 performed by a DN, e.g. the DN 300 in FIG. 3, for discovering wireless communication nodes, in accordance with some embodiments of the present disclosure. At operation 412, the DN determines management related information about a plurality of relay nodes associated with the DN. At operation 414, the DN generates respective configuration information to be utilized by a relay node to transmit a discovery signal in order to be discovered by at least one other relay node. At operation 416, the DN transmits the respective configuration information to each of the plurality of relay nodes.

Figure 4B:
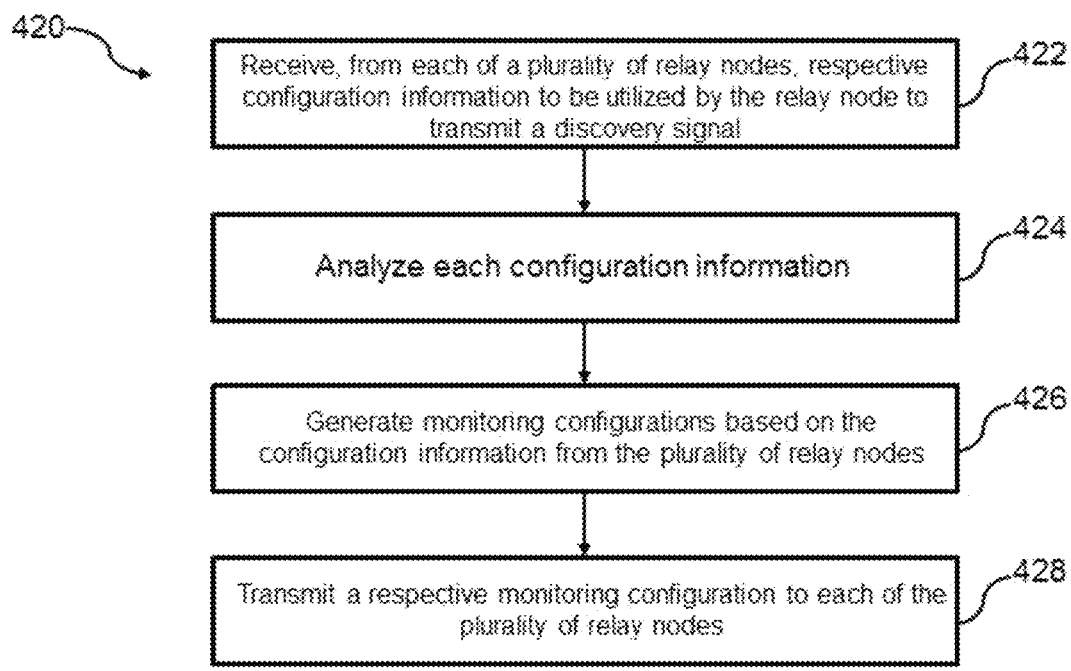
FIG. 4B illustrates a flow chart for another method performed by a DN for discovering wireless communication nodes, in accordance with some embodiments of the present disclosure.

FIG. 4B illustrates a flow chart for another method 420 performed by a DN, e.g. the DN 300 in FIG. 3, for discovering wireless communication nodes, in accordance with some embodiments of the present disclosure. At operation 422, the DN receives, from each of a plurality of relay nodes, respective configuration information to be utilized by the relay node to transmit a discovery signal. At operation 424, the DN analyzes each configuration information. At operation 426, the DN generates monitoring configurations based on the configuration information from the plurality of relay nodes. At operation 428, the DN transmits a respective monitoring configuration to each of the plurality of relay nodes.

Figure 5:
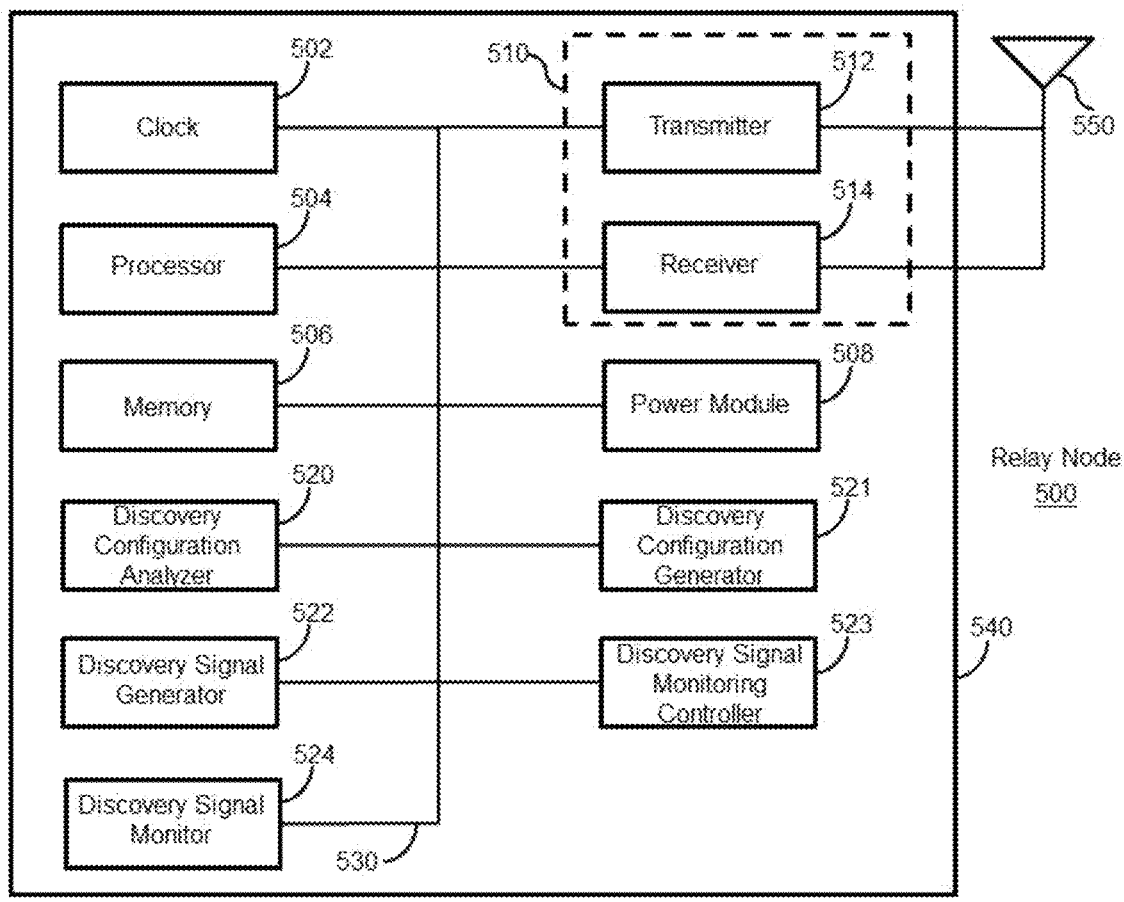
FIG. 5 illustrates a block diagram of a relay node (RN), in accordance with some embodiments of the present disclosure.

FIG. 5 illustrates a block diagram of a relay node (RN) 500, in accordance with some embodiments of the present disclosure. The RN 500 is an example of a node that can be configured to implement the various methods described herein. As shown in FIG. 5, the RN 500 includes a housing 540 containing a system clock 502, a processor 504, a memory 506, a transceiver 510 comprising a transmitter 512 and a receiver 514, a power module 508, a discovery configuration analyzer 520, a discovery configuration generator 521, a discovery signal generator 522, a discovery signal monitoring controller 523, and a discovery signal monitor 524.

In this embodiment, the system clock 502, the processor 504, the memory 506, the transceiver 510 and the power module 508 work similarly to the system clock 302, the processor 304, the memory 306, the transceiver 310 and the power module 308 in the DN 300. An antenna 550 or a multi-antenna array 550 is typically attached to the housing 440 and electrically coupled to the transceiver 510.

In a communication system, the RN 500 may be associated with a DN. For example, the RN 500 may be connected to a parent node and a child node, in a multi-hop relay system. But the RN 500 may want to discover other relay nodes in other branches of the multi-hop relay system, and/or want the other relay nodes in the other branches to discover the RN 500.

In one embodiment, the RN 500 and other relay nodes may discover each other based on configuration information generated by the associated DN. For example, the discovery configuration analyzer 520 may receive, via the receiver 514, configuration information from the DN. The discovery configuration analyzer 520 may analyze the configuration information to determine its content and indications.

In one embodiment, the configuration information comprises information about at least one of the following: a first subcarrier spacing for a transmission of the discovery signal; a time domain configuration for the transmission of the discovery signal; a frequency position for the transmission of the discovery signal; and a monitoring configuration for monitoring at least one other discovery signal transmitted by at least one other RN. In one embodiment, the time domain configuration comprises information related to at least one of: a transmission window period for the transmission of the discovery signal; an offset of a transmission window that refers to a time window for transmitting the discovery signal; at least one time domain position in the transmission window for the transmission of the discovery signal; at least one hop order of the RN 500; at least one identifier of the RN 500; and at least one cell identifier for the RN 500. The offset indicates which transmission window in the transmission window period to transmit the discovery signal. Candidate time domain positions in the transmission window for the transmission of the discovery signal are the same as candidate time domain positions in the transmission window for a transmission of an SSB with a same subcarrier spacing as the discovery signal. The at least one time domain position is indicated by a bitmap whose size is equal to a quantity of the candidate time domain positions and determined by a frequency band range in which the discovery signal is located. In one embodiment, the time domain configuration for the transmission of the discovery signal is different from a time domain configuration for a transmission of an SSB during an initial access process of a UE or a child node of the RN 500.

In one embodiment, the frequency position for the transmission of the discovery signal refers to a center frequency position of the discovery signal. The frequency position for the transmission of the discovery signal is indicated by a new radio absolute radio frequency channel number (NR-ARFCN). A default value of the frequency position for the transmission of the discovery signal is a carrier center frequency or a center frequency of an SSB for an initial access process for a UE of the RN 500. In one embodiment, the frequency position for the transmission of the discovery signal is not on a synchronization raster of a carrier frequency in which the RN 500 operates.

In one embodiment, the configuration information comprises at least one time domain configuration for at least one child node of the RN 500 to transmit discovery signals. The discovery configuration analyzer 520 may send the analyzed configuration information to the discovery signal generator 522 for generating a discovery signal, and/or to the discovery signal monitor 524 for monitoring other discovery signals of other RNs.

In one embodiment, the discovery signal generator 522 may transmit, via the transmitter 512, a discovery signal in order to be discovered by other RNs, based on the configuration information analyzed by the discovery configuration analyzer 520. In one example, each of the relay nodes associated with the DN receives respective configuration information, such that the RN 500 and at least one other RN transmit their discovery signals at different time domain positions based on their respective configuration information.

The discovery signal monitor 524 in this example may monitor at least one other discovery signal transmitted by at least one other RN based on the configuration information analyzed by the discovery configuration analyzer 520, e.g. the monitoring configuration from the discovery configuration analyzer 520. In one embodiment, the monitoring configuration comprises information about at least one of: a frequency position for monitoring the at least one other discovery signal, a second subcarrier spacing of the at least one other discovery signal, and at least one monitoring window configuration. In one embodiment, the frequency position for monitoring the at least one other discovery signal refers to a center frequency position of the at least one other discovery signal. In one embodiment, a default value of the frequency position for monitoring the at least one other discovery signal is a carrier center frequency or a center frequency position for the transmission of the discovery signal. In one embodiment, a default value of the second subcarrier spacing is a subcarrier spacing of an SSB for an initial access process of the monitored at least one other RN. In one embodiment, each of the at least one monitoring window configuration corresponds to at least one cell or at least one monitored RN.

In one embodiment, the at least one monitoring window configuration comprises at least one of: a monitoring window period; an offset of a monitoring window; a duration of the monitoring window; a time domain position of the at least one discovery signal monitored in the monitoring window; time domain configurations for transmissions of discovery signals by the other RNs; at least one identifier for at least one monitored cell; at least one hop order for at least one monitored RN; and at least one identifier for the at least one monitored RN. The offset of the monitoring window indicates which monitoring window within the monitoring window period to monitor the at least one discovery signal. The time domain position of the at least one discovery signal is indicated by a bitmap whose size is determined by a frequency band range in which the at least one discovery signal is monitored.

The discovery signal monitoring controller 523 in this example may control the discovery signal monitoring of the RN 500, e.g. based on the monitoring configuration from the discovery configuration analyzer 520. For example, after the discovery signal monitoring controller 523 determines that there is a conflict between the monitoring configuration and a transmission configuration for transmitting data of the RN 500, the discovery signal monitoring controller 523 may determine, based on a pre-determined priority rule, whether to monitor the at least one other discovery signal according to the monitoring configuration or to transmit data at the conflicted time position.

According to different discovery configuration modes, the discovery configuration analyzer 520 may either receive configuration information comprising a monitoring configuration or receive an independent monitoring configuration. In the latter case, the discovery configuration generator 521 may generate configuration information for the RN 500 itself, and transmit, via the transmitter 512, the configuration information to the DN associated with the RN 500. In this case, the configuration information comprises information about at least one of the following: a first subcarrier spacing for a transmission of the discovery signal; a time domain configuration for the transmission of the discovery signal; and a frequency position for the transmission of the discovery signal. The time domain configuration may comprise information related to at least one of: a transmission window period for the transmission of the discovery signal; an offset of a transmission window that refers to a time window for transmitting the discovery signal; at least one time domain position in the transmission window for the transmission of the discovery signal; at least one hop order of the RN 500; at least one identifier of the RN 500; and at least one cell identifier for the RN 500. In one embodiment, the offset indicates which transmission window in the transmission window period to transmit the discovery signal. In one embodiment, candidate time domain positions in the transmission window for the transmission of the discovery signal are the same as candidate time domain positions in the transmission window for a transmission of an SSB with a same subcarrier spacing as the discovery signal. In one embodiment, the at least one time domain position is indicated by a bitmap whose size is equal to a quantity of the candidate time domain positions and determined by a frequency band range in which the discovery signal is located.

In one embodiment, generating the configuration information comprises determining the offset of the transmission window by randomly determining one transmission window in the transmission window period to transmit the discovery signal. In one embodiment, the configuration information is generated by the discovery configuration generator 521, in a manner such that: the time domain configuration for the transmission of the discovery signal is different from a time domain configuration for a transmission of an SSB during an initial access process of a UE or a child node of the RN 500; and/or the frequency position for the transmission of the discovery signal is not on a synchronization raster of a carrier frequency in which the RN 500 operates.

The discovery configuration generator 521 may send the generated configuration information to the discovery signal generator 522 for generating discovery signals. The discovery signal generator 522 in this case may transmit, via the transmitter 512 and based on the configuration information, a discovery signal in order to be discovered by other RNs. In one embodiment, the RN 500 and at least one other RN transmit their discovery signals at different time domain positions based on their respective configuration information. The discovery signal monitor 524 in this case may monitor at least one other discovery signal transmitted by at least one other RN based on the independent monitoring configuration received by the discovery configuration analyzer 520.

The various modules discussed above are coupled together by a bus system 530. The bus system 530 can include a data bus and, for example, a power bus, a control signal bus, and/or a status signal bus in addition to the data bus. It is understood that the modules of the RN 500 can be operatively coupled to one another using any suitable techniques and mediums.

Although a number of separate modules or components are illustrated in FIG. 5, persons of ordinary skill in the art will understand that one or more of the modules can be combined or commonly implemented. For example, the processor 504 can implement not only the functionality described above with respect to the processor 504, but also implement the functionality described above with respect to the discovery configuration generator 521. Conversely, each of the modules illustrated in FIG. 5 can be implemented using a plurality of separate components or elements.

Figure 6A:
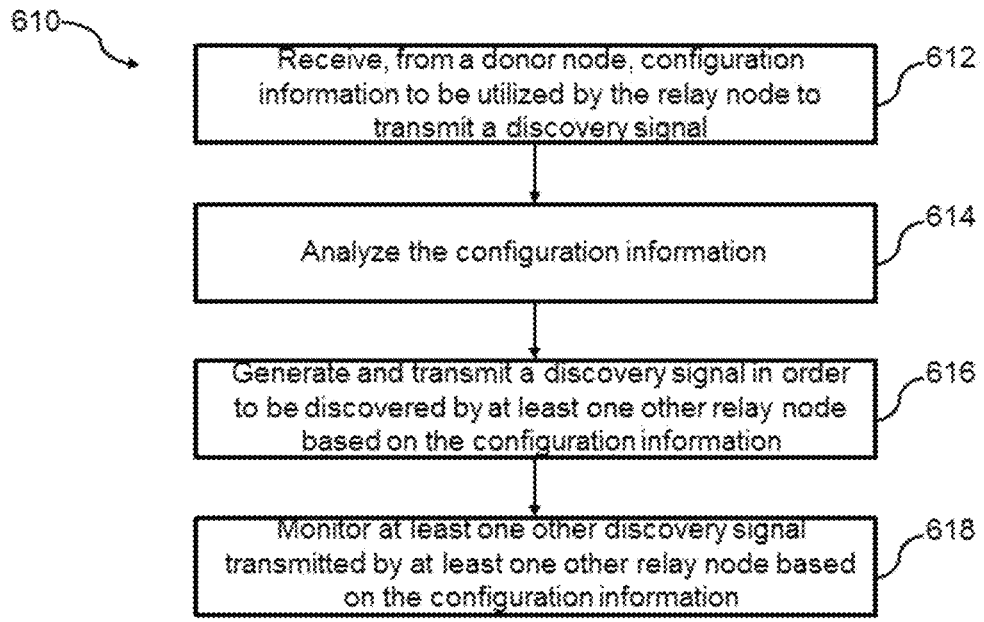
FIG. 6A illustrates a flow chart for a method performed by a RN for discovering wireless communication nodes, in accordance with some embodiments of the present disclosure.

FIG. 6A illustrates a flow chart for a method 610 performed by a RN, e.g. the RN 500 in FIG. 5, for discovering wireless communication nodes, in accordance with some embodiments of the present disclosure. At operation 612, the RN receives, from a donor node, configuration information to be utilized by the RN to transmit a discovery signal. At operation 614, the RN analyzes the configuration information. At operation 616, the RN generates and transmits a discovery signal in order to be discovered by at least one other relay node based on the configuration information. At operation 618, the RN monitors at least one other discovery signal transmitted by at least one other relay node based on the configuration information.

Figure 6B:
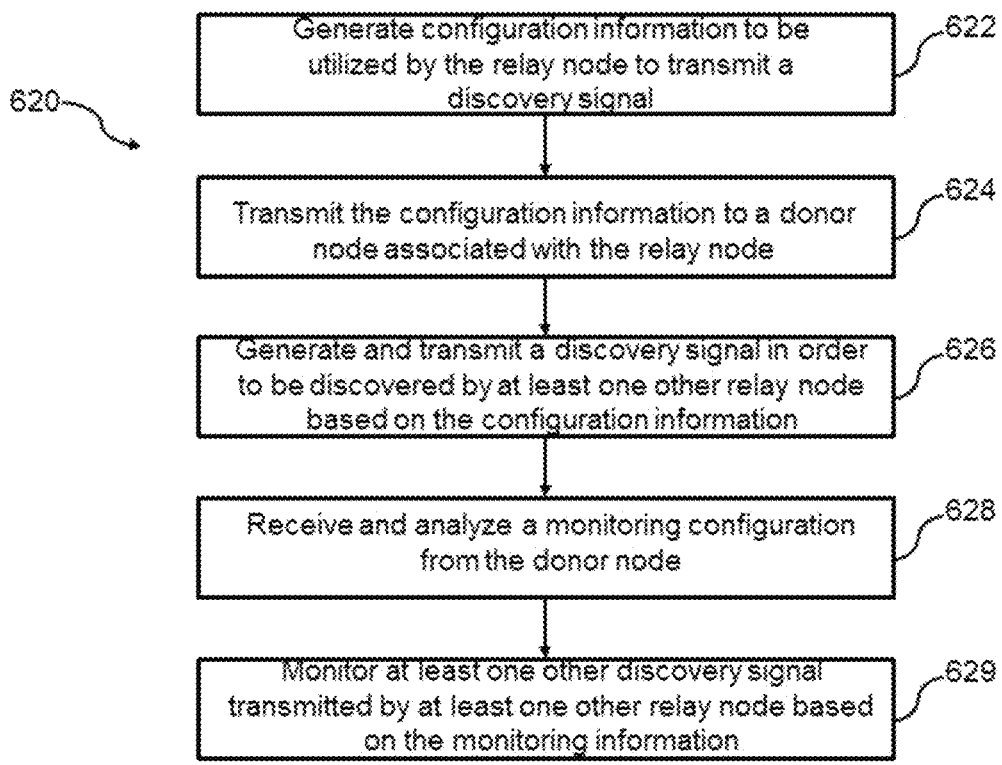
FIG. 6B illustrates a flow chart for another method performed by a RN for discovering wireless communication nodes, in accordance with some embodiments of the present disclosure.

FIG. 6B illustrates a flow chart for another method performed by a RN, e.g. the RN 500 in FIG. 5, for discovering wireless communication nodes, in accordance with some embodiments of the present disclosure. At operation 622, the RN generates configuration information to be utilized by the relay node to transmit a discovery signal. At operation 624, the RN transmits the configuration information to a donor node associated with the relay node. At operation 626, the RN generates and transmits a discovery signal in order to be discovered by at least one other relay node based on the configuration information. At operation 628, the RN receives and analyzes a monitoring configuration from the donor node. At operation 629, the RN monitors at least one other discovery signal transmitted by at least one other relay node based on the monitoring information.

Different embodiments of the present disclosure will now be described in detail hereinafter. It is noted that the features of the embodiments and examples in the present disclosure may be combined with each other in any manner without conflict.

According to one embodiment, the network side may provide discovery signal configuration information for an IAB node. The configuration information may include one or more of the following: a subcarrier spacing (SCS) used by the discovery signal, a time domain configuration of the discovery signal transmission, and a monitoring configuration of the discovery signal.

Further, the time domain configuration of the discovery signal transmission is characterized in that it comprises at least one of: a period of a transmission window, an offset of a transmission window, and a time domain position of a discovery signal in the transmission window. The transmission window refers to a half-frame time window for transmitting a discovery signal. The offset of the transmission window is used to indicate which transmission window in the transmission window period to transmit a discovery signal. The time domain positions of the discovery signal in the transmission window may be indicated by a bitmap. The size of the bitmap is determined by the range of the frequency band in which the discovery signal is located.

Further, the time domain configuration of the discovery signal transmission is further characterized by using the configured IAB node identifier or the cell identifier. Further, the network side provides one or more sets of the time domain configurations of the discovery signal transmission for the IAB node. The one or more sets of the time domain configurations of the discovery signal transmission are used for the IAB node and the child IAB nodes of the IAB node to transmit discovery signals. Each set is used for at least one IAB node to send a discovery signal.

Further, the monitoring configuration of the discovery signal is characterized in that the timing configuration for instructing the IAB node to monitor or measure the discovery signal includes at least one of: a frequency position of the monitoring, a subcarrier spacing of the monitored discovery signal, and one or more monitoring window configurations. The frequency position of the monitoring refers to a center frequency position of the monitored discovery signal. Further, the subcarrier spacing of the monitored discovery signal is characterized in that the default value of the subcarrier spacing is a subcarrier spacing of SSB provided by the IAB node for an initial access.

Further, the one or more monitoring window configurations are characterized in that each monitoring configuration corresponds to one or more cells, or one or more IAB nodes. Further, the monitoring window configuration includes at least one of: a period of the monitoring window, an offset of the monitoring window, a duration of the monitoring window, a time domain position of the discovery signal monitored in the monitoring window, one or more monitored cells, and one or more identifiers for IAB nodes. The offset of the monitoring window is used to indicate which monitoring window within the monitoring window period is used for monitoring the discovery signal. The time domain location of the discovery signal being monitored in the monitoring window is indicated by bitmap. The size of the bitmap is determined by the range of the frequency band in which the monitored signal is being monitored.

Further, the discovery signal configuration information is characterized by further including a frequency position of the discovery signal. The frequency position of the discovery signal refers to a center frequency position of the discovery signal. Further, the frequency position of the monitoring is characterized in that the default value of the frequency position is a carrier center frequency or a frequency position of the discovery signal. Further, the frequency domain position of the discovery signal may be indicated by an NR absolute radio frequency channel number (NR-ARFCN). A default value of the frequency domain location of the discovery signal is a carrier center frequency or a center frequency position of an SSB provided by the IAB node for initial access.

An IAB node may receive the discovery signal configuration information provided by the network side. The configuration information includes one or more of the following: a subcarrier spacing (SCS) used by the discovery signal, a time domain configuration of the discovery signal transmission, and a monitoring configuration of the discovery signal.

The IAB node may send a discovery signal according to the configuration information and/or listens to discovery signals sent by other IAB nodes. Further, the time domain configuration of the discovery signal transmission includes at least one of: a period of the transmission window, an offset of the transmission window, and a time domain position of the discovery signal in the transmission window. The transmission window refers to a half-frame time window for transmitting a discovery signal. The offset of the transmission window is used to indicate which transmission window in the transmission window period to transmit a discovery signal. The time domain position of the discovery signal in the transmission window is indicated by a bitmap. The size of the bitmap is determined by the range of the frequency band in which the discovery signal is located.

Further, the time domain configuration of the discovery signal transmission is further characterized by: using the configured IAB node identifier or the cell identifier. Further, the IAB node sends a discovery signal according to the configuration information. A discovery signal is sent in a transmission window indicated by the offset of the transmission window in each transmission window period.

During a first transmission window period, the discovery signal is transmitted in the transmission window indicated by the offset of the transmission window. The transmission window in the subsequent transmission window period is determined by the index of the transmission window in the previous transmission window period. The first transmission window period refers to the first transmission window period after the IAB node receives the time domain configuration of the discovery signal provided by the network side.

In one embodiment, the IAB node determines, according to its hop order or number, IAB node identifier, or cell identifier, a transmission window for transmitting a discovery signal in a transmission window period. For example, using a hop order to determine a transmission window index, e.g. based on (hop order+1) mod N, where N is the number of available transmission windows in the transmission window period.

Further, for each transmission window period, the time domain locations of the discovery signals in the transmission window are the same. Further, the monitoring configuration of the discovery signal is characterized in that the timing configuration for instructing the IAB node to monitor or measure the discovery signal includes at least one of: a frequency position of the monitoring, a subcarrier spacing of the monitored discovery signal, and one or more monitoring window configurations. The frequency position of the monitoring refers to a center frequency position of the monitored discovery signal.

Further, the subcarrier spacing of the monitored discovery signal is characterized in that a default value of the subcarrier spacing is a subcarrier spacing of an SSB provided by the IAB node for the initial access. Further, the one or more monitoring window configurations are characterized in that each monitoring configuration corresponds to one or more cells, or one or more IAB nodes.

Further, the monitoring window configuration includes at least one of: a period of the monitoring window, an offset of the monitoring window, a duration of the monitoring window, a time domain position of the discovery signal monitored in the monitoring window, one or more monitored cells, and one or more identifiers for IAB nodes. The offset of the monitoring window is used to indicate which monitoring window within the monitoring window period is for monitoring the discovery signal. The time domain location of the discovery signal being monitored in the monitoring window is indicated by a bitmap, whose size is determined by the range of the frequency band in which the monitored signal is being monitored.

Further, the IAB node monitors the discovery signal sent by the other IAB nodes according to the configuration information, and is characterized in that: if the configuration of the monitoring window conflicts with the data transmission of the IAB node, especially the periodically-transmitted cell-level signal or information, some priority rules can be pre-determined for the IAB node. An IAB node can determine whether to monitor the discovery signal or send data according to the priority rule. Alternatively, without a limitation by a protocol, the IAB node decides by itself whether to monitor the discovery signal or transmit the data. Further, the IAB node may also decide the timing for monitoring the discovery signal, as long as it does not conflict with the transmission timing of the important data of the IAB node, especially not conflicting with the periodically transmitted cell-level signal or information.

According to another embodiment, the network side receives the time domain configuration of the discovery signal transmission provided by an IAB node. The time domain configuration of the discovery signal transmission is used by the network side to provide a monitoring configuration of the discovery signal for other IAB nodes, so that the IAB node can be discovered by other IAB nodes.

The network side provides the IAB node with a monitoring configuration for monitoring the discovery signal. The monitoring configuration of the discovery signal is used to instruct the IAB node to monitor or measure the timing configuration of the discovery signal, including at least one of: a frequency position of the monitoring, a subcarrier spacing of the monitored discovery signal, and one or more monitoring window configurations. The frequency position of the monitoring refers to a center frequency position of the monitored discovery signal. Other information related to the monitoring configuration is similar to that in the previous embodiment.

On the IAB node side, the IAB node may receive the monitoring configuration of the discovery signal provided by the network side. The IAB node monitors or measures the discovery signal sent by other IAB nodes according to the monitoring configuration of the discovery signal. Other information and operations related to the monitoring configuration may be similar to those in the previous embodiment.

Further, the IAB node can determine the time domain configuration of the discovery signal transmission. The IAB node may determine an offset of the transmission window, e.g. to transmit the discovery signal in which transmission window in the transmission window period, according to the following method. The IAB node randomly determines one transmission window in the transmission window period for transmitting a discovery signal. For example, the IAB node randomly generates an integer in the range [0, N−1] as a transmission window index for transmitting a discovery signal in a transmission window period, where N is the number of available transmission windows in the transmission window period.

Further, the IAB node can also determine by itself the time domain location of the discovery signal in the transmission window. Further, the IAB node provides the network side with a time domain configuration for sending the discovery signal, including one or more of the following: a period of the transmission window, an offset of the transmission window, a time domain location of the discovery signal in the transmission window, an IAB node identifier or a cell identifier.

According to various embodiments, the network side may include an Operation Management Maintenance (OAM) or an Equipment Management System (EMS) or a Network Management System (NMS) or an IAB donor or a parent IAB node or a manager IAB node. In the following embodiments, the network side uses the IAB donor as an example, the IAB donor provides the configuration information to the IAB nodes.

In a first embodiment, the IAB donor provides time domain configuration for discovery signal transmission. This embodiment is a scheme for configuring the time domain configuration of the discovery signal transmission in a centralized manner, and focuses on how the IAB node sends the discovery signal. The main process may include the follow steps.

In a first step, the IAB donor provides the time domain configuration of the discovery signal transmission for the IAB node;

Optionally, the IAB donor provides the IAB node with a frequency location of the discovery signal, wherein the frequency domain location of the discovery signal refers to a center frequency position of the discovery signal, which can be represented by NR-ARFCN. In one example, the frequency position of the discovery may be represented by an integer between 0 and 3279165, with each integer corresponding to an absolute frequency position of the NR system. Preferably, the frequency location is not on the synchronization raster.

When the IAB donor does not provide the frequency domain location of the discovery signal for the IAB node, the frequency domain location of the discovery signal may be the carrier center frequency or the center frequency location of the SSB provided by the IAB node for initial access. The specific details of the time domain configuration of the discovery signal transmission are described below.

Figure 7:
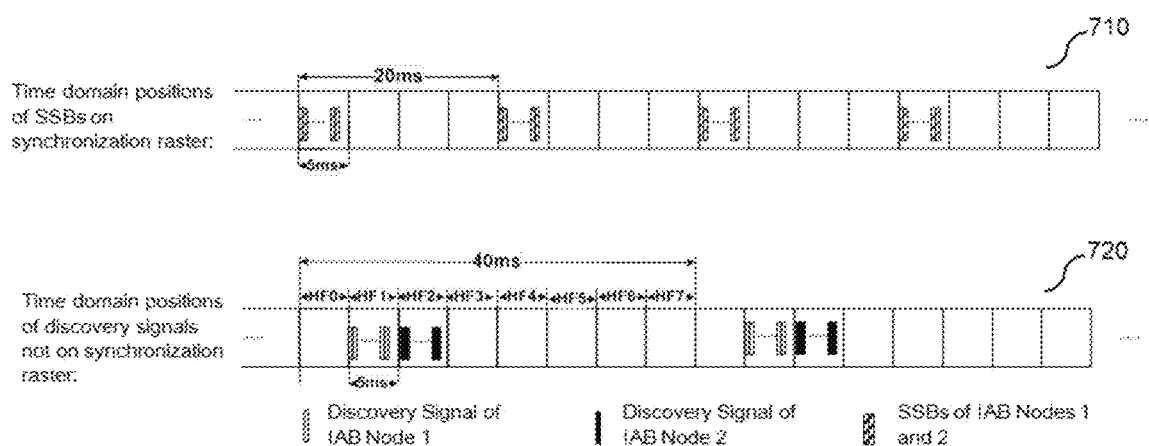
FIG. 7 illustrates exemplary time domain configurations for transmitting discovery signals, in accordance with some embodiments of the present disclosure.

FIG. 7 illustrates exemplary time domain configurations for transmitting discovery signals, in accordance with some embodiments of the present disclosure. Suppose that the time domain positions of the SSBs sent by multiple IAB nodes on the synchronization raster 710 are the same, and the synchronization period is also the same. As shown in FIG. 7, two IAB nodes (IAB node1 and IAB node2) with a synchronization period of 20 ms are given. The shaded squares on the synchronization raster 710 represent the SSBs of both IAB nodes. The IAB node1 and IAB node2 always send SSBs in the same time domain position. In addition, each IAB node cannot receive other data at the same time when sending data, due to the half-duplex constraint. As such, the two IAB nodes will never be able to find each other, without additional discovery signal transmissions as shown on the non-synchronization raster 720.

As shown in FIG. 7, on the non-synchronization raster 720 (or any frequency position configured by the IAB node), the time domain configuration of the discovery signal transmission includes the transmission window period and offset of the discovery signal. The transmission window refers to a half-frame time window for transmitting a discovery signal, that is, a 5-ms half-frame. For example, the transmission window period of the discovery signal is 40 ms, and there are eight 5-ms transmission windows in a transmission window period of 40 ms, which are recorded as HF0, HF1, . . . , HF7, corresponding to transmission windows with index numbers of 0, 1, . . . , 7. The transmission window configured by the IAB donor for IAB node1 has an offset of 1, that is, the discovery signal is transmitted at HF1 in the period. The transmission window configured for IAB node2 has an offset of 2, that is, the discovery signal is transmitted at HF2 in the period.

The IAB donor may further indicate the IAB node about which time domain locations within each transmission window to transmit the discovery signal. The time domain location is indicated by a bitmap, and the length of the bitmap is determined by the frequency band in which the discovery signal is located. For example, the length of the bitmap may be the same as the maximum number of beams scanned for the SSBs in each frequency band. For example, for the frequency bands of 3 GHz and below 3 GHz, the length of bitmap is 4; for the frequency bands of 6 GHz, or above 3 GHz but below 6 GHz, the bitmap length is 8; for the frequency bands above 6 GHz, the bitmap length is 64.

Figure 8:
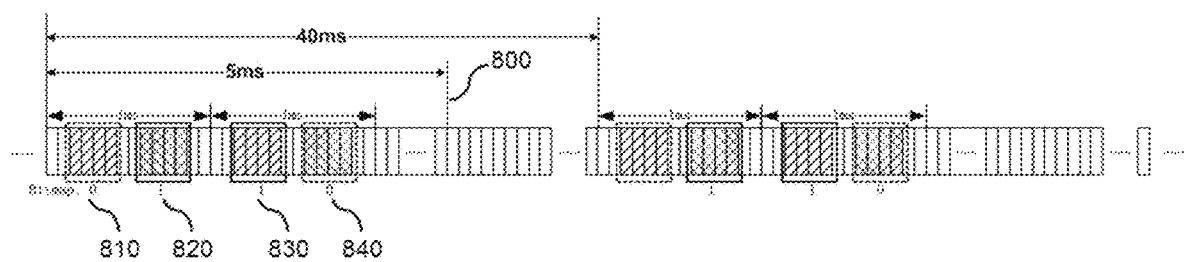
FIG. 8 illustrates exemplary time domain positions in a transmission window for transmitting discovery signals, in accordance with some embodiments of the present disclosure.

FIG. 8 illustrates exemplary time domain positions in a transmission window for transmitting discovery signals, in accordance with some embodiments of the present disclosure. As shown in FIG. 8, taking the frequency band below 3 GHz as an example, it is assumed that the potential time domain position of the signal is the same as the SSBs, and the discovery signal has a subcarrier spacing of 15 kHz, with 14 OFDM symbols in one millisecond. The maximum number of beams of a discovery signal transmission in the transmission window 800 and the maximum number of beams transmitted for the SSBs having a same subcarrier spacing are the same and equal to four. Then, a 4-bit bitmap can be used to indicate the position at which the discovery signal is actually transmitted. It is assumed that 0 and 1 in the bitmap indicate that the discovery signal is not transmitted, and the discovery signal is transmitted at the corresponding time domain position, respectively. For example, bitmap 0110 indicates that the discovery signal is transmitted at the second and third SSB positions 820, 830, and the discovery signal is not transmitted at the first and fourth SSB positions 810, 840. Preferably, the time domain location of the discovery signal in the transmission window is the same for each transmission window period.

In the second step, the IAB node sends a discovery signal in the corresponding frequency domain and time domain location according to the configuration provided by the IAB donor. The IAB node sends a discovery signal in the corresponding time domain position according to the time domain configuration of the discovery signal provided by the IAB donor, until the new time domain configuration of the discovery signal is received. Then the discovery signal will be sent according to the new configuration.

The IAB node can use the following exemplary methods to send a discovery signal according to the time domain configuration of the discovery signal sent by the IAB donor.

In a first exemplary method, the discovery signal is transmitted according to a time domain configuration for the discovery signal transmission provided by the IAB donor during each transmission window period. For example, if the IAB donor indicates that the discovery signal is transmitted in the second transmission window (e.g., HF1) within the transmission window period, the discovery signal is transmitted in the second transmission window in each transmission window period.

In a second exemplary method, the discovery signal is transmitted in the first transmission window period according to the time domain configuration for the discovery signal transmission provided by the IAB donor. The transmission window for transmitting the discovery signal in the subsequent transmission window period is determined by the index of the transmission window in the previous transmission window period, for example, (index+1) mod (T/5), where index is the index for the transmission window of the previous transmission window period, and T is the transmission window period, in milliseconds.

In a third exemplary method, the IAB node determines, according to its hop order/number or IAB node identifier or cell identifier, a transmission window for transmitting a discovery signal in a transmission window period. For example, the IAB node determines a transmission window index using a hop order, e.g. based on (hop order+1) mod (T/5), wherein the other parameters are similar to those of the second exemplary method.

The first transmission window period refers to the first transmission window period after the time domain configuration of the discovery signal provided by the IAB donor is received by the IAB node. In a specific implementation, the network can adopt one of the above mentioned methods, and can also indicate which method is used for each IAB node.

In this embodiment, if the IAB donor does not provide the IAB node with which time domain locations in each transmission window to send the discovery signal, the IAB node itself determines the time domain location of the discovery signal sent in each transmission window. For each transmission window period, the time domain locations of the discovery signals in the transmission window are the same.

In a second embodiment, the IAB donor does not provide a time domain configuration for discovery signal transmission or only provides a transmission window period in a time domain configuration for discovery signal transmission. This embodiment is a scheme for configuring the time domain configuration of the discovery signal in a distributed manner, and focuses on how the IAB node sends the discovery signal. The main process may include the following steps.

In a first step, the IAB donor provides the IAB node with the frequency location of the discovery signal. The frequency domain position of the discovery signal can be represented by NR-ARFCN. According to one protocol, the frequency domain position of the discovery signal is represented by an integer between 0 and 3279165, where each integer corresponds to an absolute frequency position of the NR system. Preferably, the frequency location is not on the synchronization raster. This step is optional. When the IAB donor does not provide the frequency domain location of the discovery signal for the IAB node, the frequency domain location of the discovery signal may be the carrier center frequency or the center frequency location of the SSB provided by the IAB node for initial access.

In a second step, the IAB node itself determines the transmission window for transmitting the discovery signal and the time domain location for transmitting the discovery signal in each transmission window. The IAB node may determine a transmission window for transmitting a discovery signal according to the following exemplary method: randomly determining a transmission window to transmit a discovery signal within a transmission window period, for example, randomly generating an integer in a range of [0, T/5-1] as a transmission window index of the discovery signal in transmission window period.

The specific time domain location for transmitting the discovery signal in each transmission window can be referred to the first embodiment. Optionally, the IAB node may provide the time domain configuration of the discovery signal to the IAB donor so that the IAB donor can send the configuration information to other IAB nodes to more effectively implement the discovery of the IAB nodes.

In a third embodiment, the IAB donor provides a monitoring configuration for discovery signals. This embodiment focuses on how the IAB node monitors the discovery signal. The main process may include the following steps.

In a first step, the IAB donor provides the IAB node with a monitoring configuration for the discovery signal. This step is an optional step. The monitoring configuration can be provided to the IAB node in a step-by-step manner, like providing the time domain configuration of the discovery signal transmission.

The monitoring configuration of the discovery signal is used to instruct a timing configuration for the IAB node to monitor or measure the discovery signal. The monitoring configuration of the discovery signal may also be referred to as the measurement timing configuration or measurement configuration of the discovery signal, including: the frequency position of the monitoring, one or more monitoring window configuration. The frequency position of the monitoring refers to a center frequency position of the monitored discovery signal. Each monitoring configuration corresponds to one or more cells, or one or more IAB nodes.

In one example, the monitoring window configuration includes: a period and an offset of the monitoring window, and a duration of the monitoring window. The duration of the monitoring window may be in the granularity of milliseconds, e.g. for continuous n milliseconds; or, in the granularity of the time slot, e.g. for consecutive n time slots.

In another example, the monitoring window configuration includes: a period and an offset of the monitoring window, and a time domain position of the discovery signal monitored in the monitoring window. The time domain position is indicated by a bitmap, and the length of the bitmap is determined by the frequency band range at which the monitored discovery signal is located. The manner for indicating the time domain location of monitoring by a bitmap is similar to indicating the time domain location for transmitting the discovery signal by a bitmap, as discussed above. The frequency position for monitoring in the above-mentioned monitoring configuration of the discovery signal is optional. When not included, a default frequency position of monitoring is the same as the transmission frequency of the discovery signal, or the same as the carrier center frequency.

In a second step, the IAB node listens for discovery signals sent by other IAB nodes. The IAB node listens for the discovery signal sent by other IAB nodes according to the monitoring configuration of the discovery signal provided by the IAB donor.

Due to the half-duplex limitation, the IAB node cannot send and receive at the same time. If the configuration of the monitoring window conflicts with the data transmission of the IAB node, especially with the periodically transmitted cell-level signal or information, some priority rules can be formulated. Based on the priority rules, the IAB node can determine whether to listen for the discovery signal or to send the data. Alternatively, without a limitation in the protocol, the IAB node can decide by itself whether to listen for the discovery signal or to send the data.

In one example, the IAB donor does not provide the monitoring configuration of the discovery signal. The timing for monitoring the discovery signal by each IAB node may be determined by the IAB node itself as long as it does not conflict with the transmission timing of the important data of the IAB node, especially not conflicting with the periodically transmitted cell-level signal or information.

In another example, the IAB donor does not provide the monitoring configuration of the discovery signal, but provides time domain configurations for the transmissions of the discovery signals by all IAB nodes to each IAB node. The timing for monitoring the discovery signal by each IAB node may be determined by each IAB node itself, based on the received time domain configurations for all IAB nodes.

A future wireless communication will be carried out at a higher frequency than the carrier frequency used in the fourth generation (4G) communication system, such as 28 GHz, 45 GHz, 70 GHz, etc., which has a large free propagation loss. It is easily absorbed by oxygen and is greatly affected by rain attenuation, which seriously affects the coverage performance of high-frequency communication systems. However, since the carrier frequency corresponding to the high-frequency communication has a shorter wavelength, it is possible to ensure that more antenna elements can be accommodated per unit area. More antenna elements mean that beamforming can be used to improve the antenna gain, thereby ensuring the coverage performance of high frequency communication.

With the beamforming, the transmitting end can concentrate the transmission energy in a certain direction, while there is little or no transmission energy in other directions. That is, each beam has its own directivity and can only cover terminals or UEs in a certain direction. A transmitting end, e.g. BS, needs to transmit beams in dozens or even hundreds of directions to complete the full coverage. A base station may send multiple Synchronous Signal/Physical Broadcast Channel Blocks (SSBs) in a beam polling manner during the synchronization period on the synchronization raster, in each synchronization period. The SSBs complete the beam polling in the half-frame (5 milliseconds) time window according to the SSBs-to-slot mapping manner specified by the protocol. The mapping position of the SSBs in the time slot in the half-frame is determined based on the carrier frequency and the sub-carrier spacing used by the SSBs. During an initial access of the UE, assuming the synchronization period is 20 milliseconds, the UE performs sweeping on the synchronization raster, thereby completing downlink synchronization and measuring to identify at least one preferred beam or port. Specifically, an SSB is composed of four Orthogonal Frequency Division Multiplexing (OFDM) symbols in the time domain, wherein a Primary Synchronous Signal (PSS) and a Secondary Synchronization Signal (SSS) occupy the first and third OFDM symbols of the SSB, respectively. In addition to the synchronization signal, the SSB also includes a physical broadcast channel (PBCH) and a demodulation reference signal corresponding to the PBCH.

In a fourth embodiment, different mapping formats are provided between a discovery signal and a SSB. This embodiment focuses on the specific mapping format of the discovery signal. A specific discovery signal can reuse the entire SSB as a discovery signal, or reuse the primary synchronization signal (PSS) and the secondary synchronization signal (SSS) as discovery signals, or reuse SSS as a discovery signal, or redesign the discovery signal.

Figure 9:
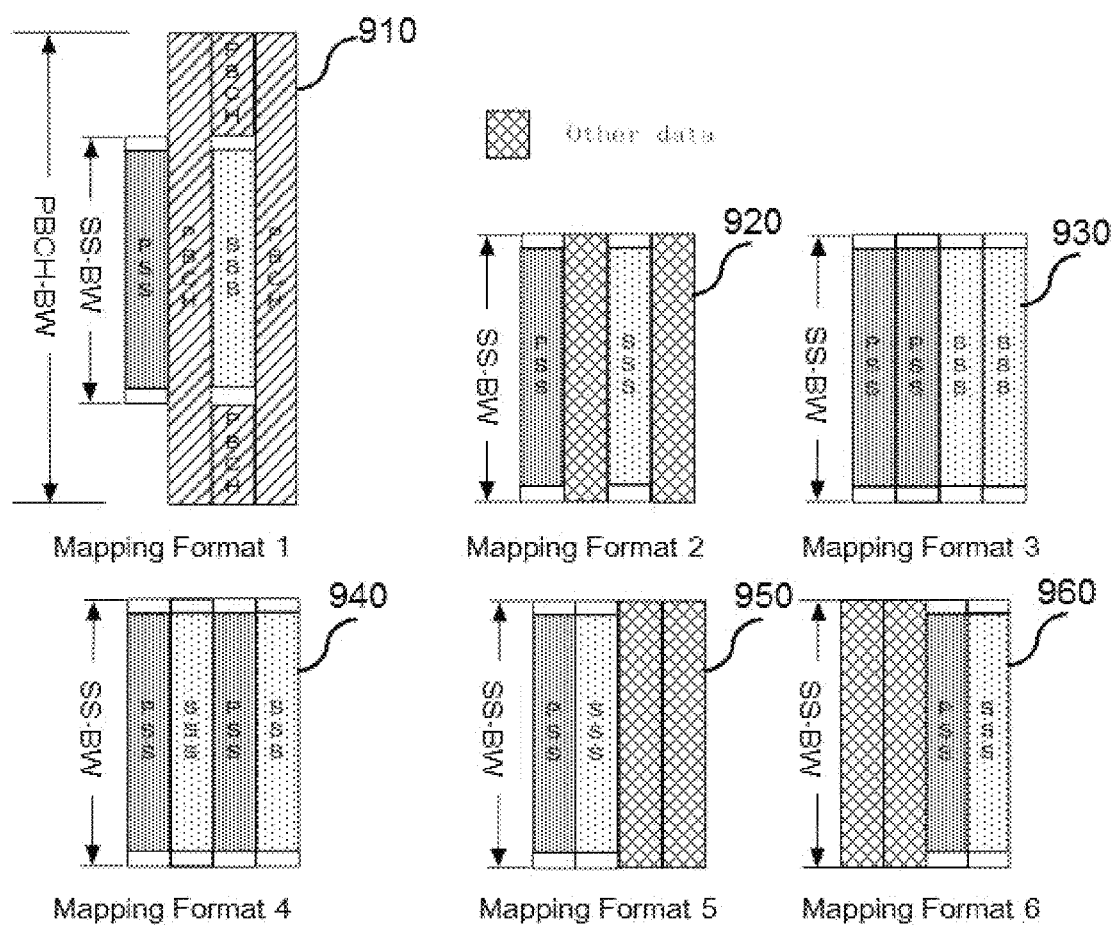
FIG. 9 illustrates exemplary mapping formats between a synchronization signal block (SSB) signal and a discovery signal, in accordance with some embodiments of the present disclosure.

FIG. 9 illustrates exemplary mapping formats between an SSB signal and a discovery signal, in accordance with some embodiments of the present disclosure. Assuming that the discovery signal is mapped in units of 4 OFDM symbols like the SSB, several mapping formats of the discovery signal are shown in FIG. 9. The bandwidth (BW) of the SS in FIG. 9 is 12 resource blocks (RBs), e.g., 144 subcarriers. The lengths of the PSS and SSS sequences are 127, where the signal power on a total of 17 subcarriers (represented by blank blocks in FIG. 9) of the OFDM symbol where the PSS and the SSS are located is 0. That is, no data is transmitted.

As shown in FIG. 9, in the mapping format 1 910, the discovery signal is the same as the SSB. In the mapping format 2 920, the discovery signal is PSS and SSS in the SSB, and the time domain positions of the PSS and the SSS are the same as those in the SSB, while the second and fourth OFDM symbols can be used to transmit other data. In the mapping format 3 930, the discovery signal is PSS and SSS in the SSB, where PSS, PSS, SSS and SSS are sequentially mapped on the 4 OFDM symbols.

As shown in FIG. 9, in the mapping format 4 940, the discovery signal is PSS and SSS in the SSB, where PSS, SSS, PSS and SSS are sequentially mapped on the 4 OFDM symbols. In the mapping format 5 950, the discovery signal is PSS and SSS in the SSB, where the PSS and SSS are in the first and second OFDM symbols, while the third and fourth OFDM symbols can be used to transmit other data. In the mapping format 6 960, the discovery signal is the PSS and SSS in the SSB, where the PSS and SSS are in the third and fourth OFDM symbols, while the first and second OFDM symbols can be used to transmit other data.

According to a seventh mapping format (not shown in FIG. 9), the discovery signal is a sequence, where the discovery signal occupies any one of 4 OFDM symbols. A protocol can stipulate which OFDM symbol is occupied. In addition to the above mapping formats, other mapping formats may also be used. The protocol may specify any of the above mapping formats. Alternatively, the network side can configure which mapping format is adopted.

The subcarrier spacing of the discovery signal in the above embodiments may be provided by the network side, or may be agreed. For example, the subcarrier spacing of the discovery signal in the frequency band below 6 GHz is 30 kHz, and the subcarrier spacing of the discovery signal in the frequency band above 6 GHz is 240 kHz. The period of the transmission window in the above embodiments may be provided by the network side, or may be agreed, for example, 160 milliseconds. The term monitoring/monitored in the present teaching may mean measuring/measured.

The present teaching provides IAB node discovery methods, where the discovery signal can be transmitted at a specific frequency position without affecting the initial access of the UE. The present teaching also provides mapping formats of the discovery signal. The discovery signal can adopt a mapping format different from the SSB. On the one hand, the new mapping format consumes less bandwidth and saves resources compared with SSB. On the other hand, mapping formats 3 and 4 use repetitive synchronization signals to improve the performance of the discovery of IAB nodes. In addition, the discovery signal can adopt different subcarrier spacing's of the SSBs of the initial access to make the configuration of the discovery signal more flexible. The use of a larger subcarrier spacing can make the discovery signal have a shorter duration in the transmission window, which is more likely to save the power consumption required by IAB nodes.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method of wireless communication, comprising:
  transmitting, by an Integrated Access and Backhaul (IAB) donor node to a plurality of IAB communication nodes comprising at least a first IAB communication node via one or more backhaul links, configuration information that is utilized by the first IAB communication node to transmit a discovery signal via a Synchronization Signal Block (SSB) in order to be discovered by a second IAB communication node that is a neighbor of the first IAB communication node, wherein the configuration information comprises a subcarrier spacing, time-domain configuration information, and frequency-domain configuration information for transmitting the discovery signal, wherein the time-domain configuration information comprises a bitmap indicating a time-domain position for a transmission of the discovery signal and a transmission timing offset for the transmission of the discovery signal in number of half-frames such that the first IAB communication node is discoverable by the second IAB communication node, wherein the discovery signal from the first IAB communication node and a second discovery signal from the second IAB communication node are transmitted at different time domain positions based on the configuration information.

2. The method of claim 1, wherein the time-domain configuration information further comprises a transmission window period for the transmission of the discovery signal.

3. A method for wireless communication, comprising:
  receiving, by a first Integrated Access and Backhaul (IAB) communication node from an IAB donor node via a backhaul link, configuration information for transmitting a discovery signal via a Synchronization Signal Block (SSB) in order to be discovered by a second IAB communication node that is a neighbor of the first IAB communication node, wherein the configuration information comprises a subcarrier spacing, time-domain configuration information, and frequency-domain configuration information for transmitting the discovery signal, wherein the time-domain configuration information comprises a bitmap indicating a time-domain position for a transmission of the discovery signal and a transmission timing offset for the transmission of the discovery signal in number of half-frames such that the first IAB communication is discoverable by the second IAB communication node, wherein the discovery signal from the first IAB communication node and a second discovery signal from the second IAB communication node are transmitted at different time domain positions based on the configuration information; and
  transmitting, by the first IAB communication node, the discovery signal according to the configuration information.

4. The method of claim 3, wherein the time-domain configuration information further comprises a transmission window period for the transmission of the discovery signal.

5. A wireless communication apparatus, implemented as an Integrated Access and Backhaul (IAB) donor node, comprising at least one processor that is configured to:
  transmit, to a plurality of IAB communication nodes comprising at least a first IAB communication node via one or more backhaul links, configuration information that is utilized by the first IAB communication node to transmit a discovery signal via a Synchronization Signal Block (SSB) in order to be discovered by a second IAB communication node that is a neighbor of the first IAB communication node, wherein the configuration information comprises a subcarrier spacing, time-domain configuration information, and frequency-domain configuration information for transmitting the discovery signal, wherein the time-domain configuration information comprises a bitmap indicating a time-domain position for a transmission of the discovery signal and a transmission timing offset for the transmission of the discovery signal in number of half-frames such that the first IAB communication node is discoverable by the second IAB communication node, wherein the discovery signal from the first IAB communication node and a second discovery signal from the second IAB communication node are transmitted at different time domain positions based on the configuration information.

6. The wireless communication apparatus of claim 5, wherein the time-domain configuration information further comprises a transmission window period for the transmission of the discovery signal.

7. A wireless communication apparatus, implemented as a first Integrated Access and Backhaul (IAB) communication node, comprising at least one processor that is configured to:
  receive, from an IAB donor node via a backhaul link, configuration information for transmitting a discovery signal via a Synchronization Signal Block (SSB) in order to be discovered by a second IAB communication node that is a neighbor of the first IAB communication node, wherein the configuration information comprises a subcarrier spacing, time-domain configuration information, and frequency-domain configuration information for transmitting the discovery signal, wherein the time-domain configuration information comprises a bitmap indicating a time-domain position for a transmission of the discovery signal and a transmission timing offset for the transmission of the discovery signal in number of half-frames such that the wireless communication apparatus is discoverable by the second IAB communication node, wherein the discovery signal from the first IAB communication node and a second discovery signal from the second IAB communication node are transmitted at different time domain positions based on the configuration information; and transmit the discovery signal according to the configuration information.

8. The wireless communication apparatus of claim 7, wherein the time-domain configuration information further comprises a transmission window period for the transmission of the discovery signal.

9. A non-transitory computer-readable medium having stored thereon computer-executable instructions for carrying out the method of claim 1.

10. The non-transitory computer-readable medium of claim 9, wherein the time-domain configuration information further comprises a transmission window period for the transmission of the discovery signal.

11. A non-transitory computer-readable medium having stored thereon computer-executable instructions for carrying out the method of claim 3.

12. The non-transitory computer-readable medium of claim 11, wherein the time-domain configuration information further comprises a transmission window period for the transmission of the discovery signal.

* * * * *